United States Patent
Leonelli et al.

[11] Patent Number: 5,306,040
[45] Date of Patent: Apr. 26, 1994

[54] COVER FOR AIRBAG

[75] Inventors: F. Paul Leonelli, Roy; Bradley D. Harris, Farmington, both of Utah

[73] Assignee: Morton International, Inc., Chicago, Ill.

[21] Appl. No.: 32,492

[22] Filed: Mar. 17, 1993

[51] Int. Cl.5 ............................................. B60R 21/16
[52] U.S. Cl. ............................... 280/728 B; 280/731; 280/732
[58] Field of Search ............... 280/728 B, 728 R, 731, 280/732, 733, 743

[56] References Cited

U.S. PATENT DOCUMENTS

| | | | |
|---|---|---|---|
| 3,794,349 | 2/1974 | Fuller | 280/150 AB |
| 4,097,064 | 6/1978 | Ikawa et al. | 280/732 |
| 4,148,503 | 4/1979 | Shiratori et al. | 280/731 |
| 4,842,299 | 6/1989 | Okamura et al. | 280/732 |
| 4,878,689 | 11/1989 | Mitzkus et al. | 280/731 |
| 4,895,389 | 1/1990 | Pack, Jr. | 280/732 |
| 4,925,209 | 5/1990 | Sakurai | 280/743 |
| 4,938,503 | 7/1990 | Muraoka et al. | 280/732 |
| 5,002,307 | 3/1991 | Heidorn | 280/728 B |
| 5,009,452 | 4/1991 | Miller | 280/731 |
| 5,013,065 | 5/1991 | Kreuzer | 280/743 |
| 5,066,039 | 11/1991 | Shitanoki | 280/741 |
| 5,174,602 | 12/1992 | Vakayama et al. | 280/728 B |
| 5,201,541 | 4/1993 | Jones et al. | 280/731 |
| 5,203,586 | 4/1993 | Niwa et al. | 280/728 B |

FOREIGN PATENT DOCUMENTS 4-050053 2/1992 Japan .............. 280/728 B

Primary Examiner—Richard M. Camby
Assistant Examiner—Christopher P. Ellis
Attorney, Agent, or Firm—Gerald K. White

[57] ABSTRACT

A plastic cover for an air bag of a vehicle occupant restraint system is designed so that the tear lines forming the bag releasing doors create the door hinges at the outer margins of the cover. Where the outer margin is curved, a thinned region permits the hinge axis to flatten. Safety corners prevent tearing of the cover material through the hinge region.

15 Claims, 2 Drawing Sheets

COVER FOR AIRBAG

TECHNICAL FIELD

This invention relates to airbags for automotive crash protection. More specifically, it relates to an improved cover for an airbag installation.

BACKGROUND ART

Automotive airbags are commonly installed to protect both the driver and the front seat passenger from injury in the event of a head-on collision. The term "airbag" is something of a misnomer because typically the bag is filled with a rapidly evolving gas produced by an igniter. The bag is designed to inflate in no more than approximately 15 milliseconds. In its uninflated and folded condition it is mounted within a housing having a cover which is designed to tear along predetermined lines to provide an opening for the escape of the airbag.

In view of the explosive nature of the airbag inflation, one of the major problems with prior art installations has been the tendency of the airbag cover to break into pieces. The pieces thereupon become projectiles capable of striking the occupants.

Airbag covers customarily are formed of materials such as thermoplastics which are somewhat resilient and have weakened or thinned regions forming tear lines. The tear lines are designed to rupture and form one or more hinged doors which permit the expanding airbag to escape. Ideally the shearing stress which bursts the tear lines is dissipated within sufficient time and distance to allow the formation of hinges which permit the doors to open but retain them in place on the cover. It would also be desirable for the doors to swing open through an arc exceeding 180° in order for them to be positioned well clear of the expanding airbag. Finally, it would be desirable to achieve these objectives while employing a one piece molded cover without the need for inserts or hardware elements.

DISCLOSURE OF INVENTION

The objectives of this invention are achieved by providing in an airbag system a resilient cover which has a front wall defining tear lines for forming a pair of substantially rectangular hinged doors. The doors have edges which are displaced inwardly from the outer margins of the front wall. Extending rearwardly from the front wall are surrounding sidewalls which enclose the unexpanded bag. The tear lines include first and second spaced offset portions which extend from one of the door edges to thereby form a door hinge which is positioned at one of the front wall margins.

BEST MODE FOR CARRYING OUT THE INVENTION

Figure 1:
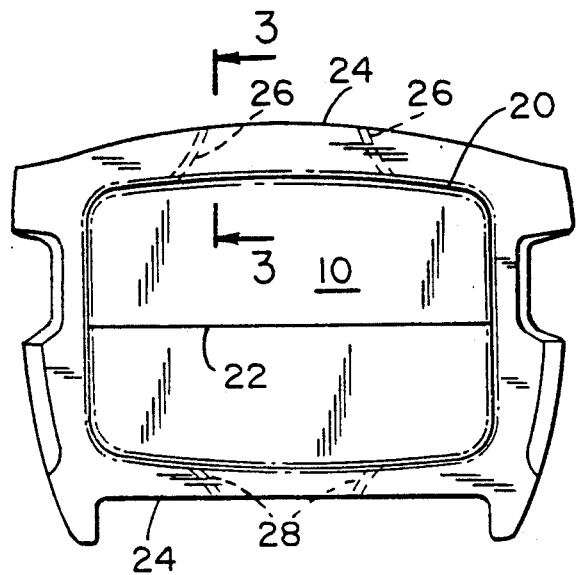
FIG. 1 is a front view of the cover of an unactivated driver's side airbag module in accordance with the present invention.
Figure 3:
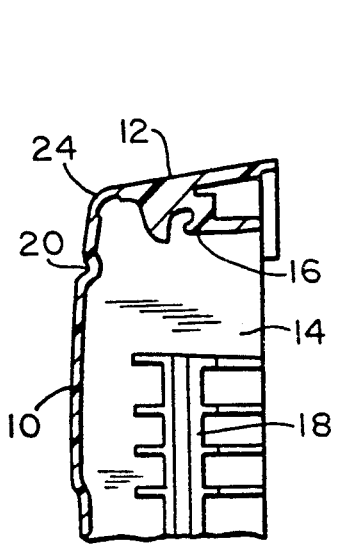
FIG. 3 is an enlarged cross-section taken substantially along the line 3—3 of FIG. 1.

Illustrated in FIGS. 1 and 3 is a molded thermoplastic airbag cover designed for installation in a steering wheel assembly. It comprises a front wall 10 bounded by rearwardly extending sidewalls including a top sidewall 12 and a left sidewall 14, as well as right and bottom sidewalls which are not illustrated. Molded mounting structures 16, 18 are employed for mounting the cover to the airbag assembly. However, they form no part of the invention and will not be further described.

The front wall 10 may carry a somewhat rectangular groove 20 which is partially aesthetic and partially tear line, as will be further explained. The groove 20 is bisected by a horizontal tear line 22. It will be understood that the tear lines are thinned and weakened portions which are designed to rupture when the airbag expands.

It will be noted that the groove 20 is displaced inwardly from the outer margin 24 of the front wall 10. In prior art airbag covers having external appearances similar to that of this invention, the groove 20 is also designed to function as a hinge. Accordingly when the tear lines rupture to form doors, the rotation of the doors is restricted to an arc of 180° by the remaining surface of the front wall 10. In accordance with the present invention, the arc through which the doors may move is greatly increased by moving the hinge of each door to the outer margin 24 of the front wall 10. This is accomplished by means of arcuate tear lines 26 formed on the inner surface of the front wall 10 and extending from the thin tear line, portion of the groove 20 to the outer margin 24 at the top of the cover as shown in FIG. 1. Similar tear lines 28, also on the inside of the cover, extend from the bottom portion of groove 20 to the outer margin 24 at the bottom of the cover.

Figure 2:
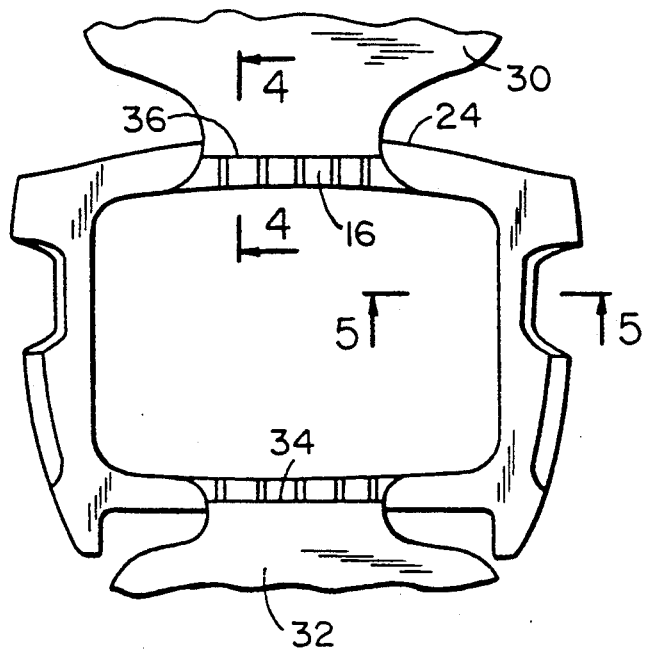
FIG. 2 is a view similar to FIG. 1 illustrating the cover after activation with the airbag release doors open.
Figure 4:
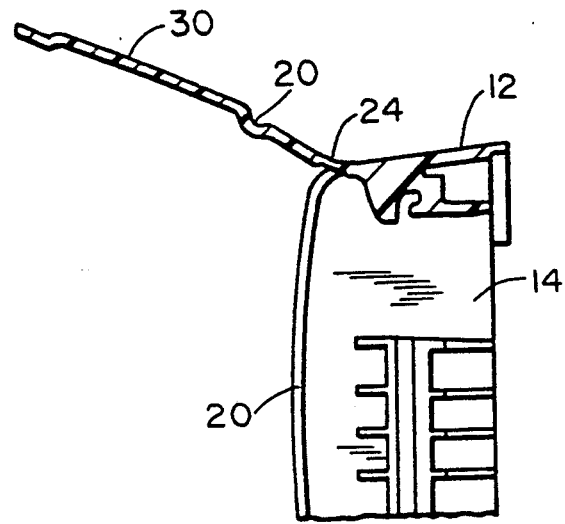
FIG. 4 is an enlarged cross-section taken substantially along the line 4—4 of FIG. 2.
Figure 5:
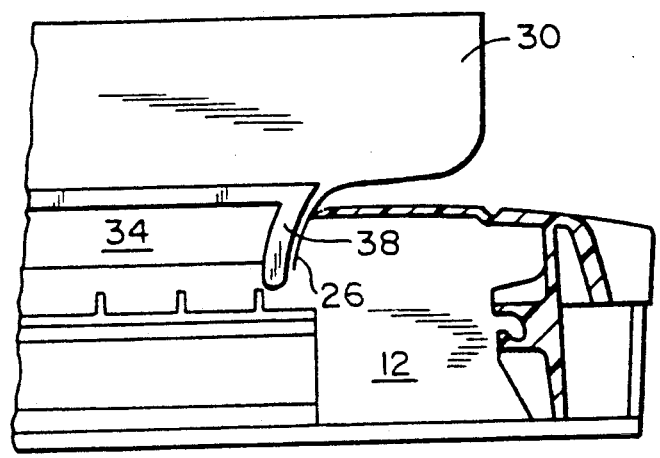
FIG. 5 is an enlarged cross-section taken substantially along the line 5—5 of FIG. 2.

FIGS. 2, 4 and 5 illustrate the manner in which this invention operates. These figures show the cover after rupture of the tear lines to form an upper door 30 and a lower door 32. As will be noted, the rupture of the tear line 20 leads into the arcuate tear lines 26 at the top of the cover and into the tear lines 28 at the bottom of the cover. As a result, the hinges for the doors are effectively moved to the outer margin 24 of the cover. As the outer margin 24 at the bottom of the cover is substantially straight, the hinge 33 has a substantially linear axis. However, the outer margin 24 at the top of the cover is curved as shown in FIG. 1. Accordingly, a hinge in this region would tend to result in stress concentrations. This could cause the hinge to tear along its axis. In order to overcome this difficulty, the cover is molded with a thinned and more resilient portion 34 in the hinge region as illustrated in FIG. 5. The result is that the hinge region 34 flexes inwardly to flatten out and form a linear hinge axis 36 as the airbag deploys and as illustrated in FIG. 2.

As previously explained, it is important to prevent any portion of the cover from detaching and becoming a projectile within the vehicle. Tearing through the thinned hinge region 34 is prevented, as illustrated in FIG. 5, by providing a thickened safety corner 38. A safety corner 38 is provided at each of the four arcuate tear lines 26, 28. As illustrated in FIG. 5, each safety corner is on the inside of the tear line and is positioned so as not to interfere with the flexing of the thinned portion 34 and the subsequent flattening of the hinge. Each of the arcuate tear lines 26 is substantially perpendicular to the hinge and extends past it.

In actual embodiments of this invention, the thermoplastic polymer cover material is Santoprene and has a thickness of 2.5-3 mm. The tear lines are 0.4-0.75 mm thick. The hinge region 34 is 2 mm thick and 10 mm wide and extends substantially the full length of the door. The safety corners are 3-4 mm thick and 3-10 mm wide.

As a result of the present invention, the doors of an activated airbag cover are able to rotate 90° further than prior art covers. This added rotation causes the doors to travel away from the vehicle occupants. Furthermore, hinge formation takes place later in the deployment procedure than is true of prior art devices. Accordingly extra margins of safety are provided which prevent cover parts from hitting vehicle occupants.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. In an air bag vehicle occupant restraint system including a resilient cover having a front wall defining first tear lines rupturable upon expansion of said air bag to form first and second substantially rectangular hinged doors through which said bag expands, each of said doors having edges displaced inwardly from outer margins of said front wall, and rearwardly extending sidewalls surrounding said front wall to enclose the unexpanded bag, the improvement which comprises:

first and second pairs of secondary arcuate tear lines extending from the first tear lines to said outer margin, thereby forming door hinges which allow full swinging motion of the doors.

2. The improvement of claim 1 wherein one of said front wall margins is curved prior to rupture and is resiliently forced into a substantially straight configuration upon formation of one of said hinges.

3. The improvement of claim 1 wherein said cover includes means for preventing tearing between each pair of said secondary arcuate tear lines.

4. The improvement of claim 3 wherein said tear preventing means comprises a thickened portion of said cover intermediate each pair of secondary arcuate tear lines.

5. The improvement of claim 4 wherein said thickened portion comprises a barrier adjacent the respective secondary arcuate tear line of each pair.

6. The improvement of claim 1 wherein one of said door hinges is in a thinner region of said cover.

7. The improvement of claim 2 wherein said cover includes means for preventing tearing between each pair of secondary arcuate tear lines.

8. The improvement of claim 7 wherein said tear preventing means comprises a thickened portion of said cover intermediate each pair of secondary arcuate tear lines.

9. The improvement of claim 8 wherein said thickened portion comprises a barrier adjacent the respective secondary arcuate tear line of each pair.

10. The improvement of claim 2 wherein said door hinge is in a thinner region of said cover.

11. The improvement of claim 7 wherein said door hinge is in a thinner region of said cover.

12. The improvement of claim 11 wherein said tear preventing means comprises a thickened portion of said cover intermediate each pair of secondary arcuate tear lines.

13. The improvement of claim 12 wherein said thickened portion comprises a barrier adjacent the respective secondary arcuate tear line of each pair.

14. The improvement of claim 10 wherein said cover is a thermoplastic polymer.

15. The improvement of claim 13 wherein said cover is a thermoplastic polymer.

* * * * *